(12) United States Patent
Jacques et al.

(10) Patent No.: US 7,504,078 B1
(45) Date of Patent: Mar. 17, 2009

(54) CONTINUOUS PRODUCTION OF ALIGNED CARBON NANOTUBES

(75) Inventors: David N. Jacques, Lexington, KY (US); Rodney J. Andrews, Lexington, KY (US)

(73) Assignee: University of Kentucky Research Foundation, Lexington, KY (US)

(*) Notice: Subject to any disclaimer, the term of this patent is extended or adjusted under 35 U.S.C. 154(b) by 0 days.

(21) Appl. No.: 11/617,779

(22) Filed: Dec. 29, 2006

Related U.S. Application Data

(62) Division of application No. 10/141,423, filed on May 8, 2002, now Pat. No. 7,160,531.

(60) Provisional application No. 60/356,272, filed on Feb. 11, 2002, provisional application No. 60/289,745, filed on May 9, 2001, provisional application No. 60/289,415, filed on May 8, 2001.

(51) Int. Cl.
*C09C 1/00* (2006.01)
*C23C 16/00* (2006.01)

(52) U.S. Cl. .................. 422/150; 422/158; 422/232; 422/233; 118/715; 118/718

(58) Field of Classification Search ............ 422/150, 422/158, 232, 233; 423/249.1, 447.1; 118/715, 118/718, 724, 725, 733; 438/478
See application file for complete search history.

(56) References Cited

U.S. PATENT DOCUMENTS

| 7,250,148 | B2* | 7/2007 | Yang et al. | 423/447.3 |
| 2001/0009693 | A1* | 7/2001 | Lee et al. | 427/249.1 |
| 2005/0238810 | A1* | 10/2005 | Scaringe et al. | 427/249.1 |
| 2005/0287064 | A1* | 12/2005 | Mayne et al. | 423/445 B |

FOREIGN PATENT DOCUMENTS

EP 1 149 932 * 10/2001

OTHER PUBLICATIONS

"Synthesis of thick and crystalline nanotube arrays by spray pyrolysis", R. Kamalakaran, M. Terrones, T. Seeger, Ph. Kohler-Redlich and M. Ruhle, Applied Physics Letters, vol. 77, No. 21, Nov. 20, 2000.*

* cited by examiner

*Primary Examiner*—N. Bhat
(74) *Attorney, Agent, or Firm*—King & Schickli, PLLC

(57) ABSTRACT

An apparatus for continuous production of aligned carbon nanotubes is disclosed. The apparatus includes a reactor, an injector for delivering a feed solution into the reactor, and a conveyor for passing through the reactor a substrate on which nanotubes may be formed and grown. The apparatus further may include an inert, porous medium through which the feed solution may be passed. The apparatus produces aligned carbon nanotubes of a predetermined external diameter, and is suitable for large scale production of aligned carbon nanotubes in an industrial setting.

20 Claims, 4 Drawing Sheets

CONTINUOUS PRODUCTION OF ALIGNED CARBON NANOTUBES

This application is a divisional of U.S. application Ser. No. 10/141,423 filed May 8, 2002 entitled "Process for the Continuous Production of Aligned Carbon Nanotubes," now U.S. Pat. No. 7,160,531, the disclosure of which is incorporated herein in its entirety by reference, which in turn claims the benefit of U.S. Provisional Patent Application Ser. Nos. 60/289,415 filed May 8, 2001, 60/289,745 filed May 9, 2001, and 60/356,272 filed Feb. 11, 2002, the disclosures of each of which are incorporated herein in their entirety by reference.

This invention was made with Government support under NSF-MRSEC grant DMR-9809606. The Government may have certain rights in this invention.

TECHNICAL FIELD

The present invention relates to apparatus for producing aligned carbon nanotubes, and more particularly to apparatus for continuous production of aligned carbon nanotubes. The invention further relates to apparatus for continuous production of aligned carbon nanotubes which do not require patterned substrates, and which further produce quantities of high quality, homogenous populations of aligned carbon nanotubes.

BACKGROUND OF THE INVENTION

Aligned carbon nanotubes have application in numerous areas of composite materials, such as for use in separation media, as catalysts, as catalyst supports, in energy storage and transfer, in electronics applications such as in electron guns for use, e.g., in flat panel television picture technology, for EMI and RF shielding such as in the cellular telephone industry, as sensors or sensor components, and for use in electronically conductive plastics. Currently utilized technologies for production of aligned carbon nanotubes are labor intensive, costly, inefficient, and are not amenable to scale-up for industrial applicability.

The synthesis of aligned carbon nanotubes, such as for example aligned multi-walled carbon nanotubes, via catalytic pyrolysis of hydrocarbons is known. Most of the known methodology for such synthesis requires use of patterned or preformed substrates to provide support to the growing nanotubes, allowing growth in an aligned pattern. Further, the presently utilized methods for synthesis of aligned carbon nanotubes rely on batch processes. While effective, batch processing methods for production of carbon nanotubes, particularly aligned carbon nanotubes, are labor intensive, costly, inefficient, and generally limited in production capacity at the industrial scale. Further, batch processing techniques may result in significant batch to batch variation in the quality of the nanotubes produced.

Accordingly, there is a need in the art for methods and apparatus for production of carbon nanotubes which result in a high quality, homogenous population of aligned nanotubes. There is further a need in the art for such apparatus which do not require specialized patterned substrates. The apparatus should reduce the labor required, and be amenable to scale-up for use in industrial applications requiring reproducibility low cost, high volume, and a high quality product.

SUMMARY OF THE INVENTION

In accordance with the purposes of the present invention as described herein, an apparatus for continuous production of aligned carbon nanotubes is taught, comprising a reactor, a conveyor for continuously passing a substrate through the reactor at a predetermined rate of travel, and an injector for delivering a feed solution dispersed in an inert carrier gas into the hollow interior of the reactor whereby aligned carbon nanotubes are formed on the substrate. Those of skill in the art will appreciate that the reactor and conveyor may be fabricated from any suitably inert material which substantially prevents carbon nanotube growth thereon. In that way, nanotube formation and growth is substantially restricted to the substrate passing through the reactor. Any suitably non-reactive metal or ceramic may be utilized, such as alumina, silicon carbide, Nichrome, and any combination. The conveyor may be controlled to pass the substrate through the reactor at a predetermined rate of travel. In one embodiment of the present invention, the conveyor passes the substrate through the reactor to provide a substrate residence time of from about 10 minutes to about 120 minutes.

The injector of the present invention comprises a tube-within-a-tube design configured for improved flow characteristics and feed consistency of the feed solution/carrier gas stream entering the reactor. In a presently preferred embodiment, the injector comprises a first hollow tube for delivering the feed solution and a second hollow tube for delivering an inert carrier gas. The first hollow tube is disposed in the interior of the second hollow tube, thereby defining an annulus between the first and second hollow tubes through which the inert carrier gas may be delivered. The end of the second tube extends beyond the corresponding end of the first tube, thereby defining a dispersion chamber wherein the feed solution is dispersed into the inert carrier gas prior to entry into the reactor.

Preferably, the first hollow tube has an outer cross-sectional area of from about 50 percent to about 90 percent of the internal cross-sectional area of the second hollow tube. In a preferred embodiment, the carrier gas is delivered through the annulus between the tubes at a Reynold's number of between about 1 and about 2000. In a particularly preferred embodiment, the carrier gas is delivered through the annulus at a Reynold's number of between about 50 and about 200. The dimensions of the first and second tubes, and their orientation relative to one another, are configured such that the dispersion chamber formed thereby preferably has a length of from about 1 to about 15 times its diameter. In a particularly preferred embodiment, the length of the dispersion chamber is from about 8 to about 10 times its diameter.

The apparatus may further include an inert, porous medium through which the feed solution/carrier gas dispersion may be passed prior to entry into the reactor. As described in the present inventor's own U.S. patent application Ser. No. 10/141,423, this provides a mechanism to control the external diameter of nanotubes formed thereby. Accordingly, the apparatus of the present invention preferably includes such an inert, porous medium terminal to the injector, in the form of a sinter fabricated from materials including, but not limited to, transition metals and their alloys, alumina, zirconia, silicon carbide, or silica ceramics. Specific examples include ceramic, alumina, steel, stainless steel, titanium, and any combination thereof. The sinter is typically selected to include a poresize of from about 0.1 μm to about 1 μm in diameter.

The injector of the present invention may be adapted to be selectively displaced within the reactor. As will be appreciated by those skilled in the art and further described below, this feature obviates the need for multiple reactors providing different temperatures, such as for example a preheater followed by a primary reactor providing the desired reaction temperature. Rather, the selectively displaceable injector of the present design allows use of a single reactor, in which the feed solution/carrier gas may be delivered at any desired temperature zone. Thus, if the injector is maintained at a lower temperature zone of the reactor, the preheating step is accomplished. Moving the injector to a higher temperature zone of the reactor will allow the desired volatilization and nanotube-growing steps to occur. Accordingly, an actuator for moving the injector, such as for example along a longitudinal axis of the reactor, may be included in the apparatus of this invention. It will be appreciated that any suitable actuator capable of moving the injector in a controlled fashion may be employed, such as a hydraulic or pneumatic cylinder, a rod-type electric cylinder, a belt-driven actuator, a ball screw-driven actuator, a robotic arm, or the like. The actuator may be coupled to a controller for remote operation. The injector may be supported by any suitable support, such as a linear guide having rollers.

It is known that the reactions by which carbon nanotubes are formed are optimal in the absence of ambient air and oxygen. Accordingly, the apparatus of the present invention may also include a means for excluding ambient air from the interior of the reactor. This feature may be accomplished by known devices, such as a nitrogen purge box or gas curtain adjacent the opening where the conveyor belt enters the reactor. Still further, a temperature controller may be provided for selectively controlling a temperature of the reactor interior.

The apparatus of the present invention may be used for continuous production of aligned carbon nanotubes, such as by the method of copending U.S. application Ser. No. 10/141, 423. As described therein, production of aligned carbon nanotubes begins with dissolving a metal catalyst in a liquid hydrocarbon source to form a feed solution and dispersing the feed solution into a stream of an inert carrier gas. In a preferred embodiment, metal catalyst is admixed with said liquid hydrocarbon to yield a metal to carbon ratio of from about 0.075 atomic percent to about 1.25 atomic percent. In an especially preferred embodiment, metal catalyst is admixed with said liquid hydrocarbon to yield a metal to carbon ratio of 0.75 atomic percent. Suitable metal catalysts include the group consisting of ferrocene, nickelocene, cobaltocene, manganocene, ruthenocene, iron napthenate, nickel napthenate, cobalt napthenate and any mixture thereof.

Any liquid hydrocarbon capable of being vaporized at a temperature of from about 150 C. to about 600 C. and having a solubility of at least 0.5 weight percent for the metal catalyst selected may be used in the method of the present invention. Accordingly it will be appreciated that the method for producing aligned carbon nanotubes of the present invention may be conducted at relatively moderate temperatures, and at atmospheric pressure, thereby reducing energy consumption and production costs and further enhancing the commercial utility thereof. Suitable liquid hydrocarbons include aromatic hydrocarbons, aliphatic hydrocarbons, or nitrogen-containing hydrocarbons. In a preferred embodiment, the liquid hydrocarbon may be xylene, toluene, benzene, hexane, pyridine, acetonitrile, or any combination thereof. The carrier gas may be selected from the noble (Group VIII) gases, nitrogen, or mixtures thereof. Typical examples include argon, helium, nitrogen, and any combination thereof. It is preferred to include hydrogen in the inert carrier gas at a concentration of up to 30 volume percent. In a particularly preferred embodiment, hydrogen is included in the carrier gas stream at a concentration of 10 volume percent.

The dispersed feed solution is then continuously introduced into the reactor and volatilized. In a preferred embodiment, the reactor should be maintained at a temperature of from about 500 C to about 900 C. In an especially preferred embodiment, the reactor is maintained at a temperature of from about 650 C to about 850 C Of course, those of skill in the art will realize that the optimal reactor temperature will depend on the volatilization temperature of the metal catalyst/liquid hydrocarbon feed solution of choice.

The rate at which the feed solution is delivered into the reactor is dependant on the metal catalyst concentration, reactor temperature, and gas flow rate. However, for optimal production of aligned carbon nanotubes, it is desirable to deliver the feed solution below a partial pressure (carbon) that elicits the co-generation of amorphous or pyrolytic carbon. An oxygen- and ambient air-free environment may be maintained within the reactor. This may be accomplished by any known means, such as for example a nitrogen purge box or a gas curtain placed at an opening of the reactor.

Concurrently therewith, a suitable substrate is continuously passed through the reactor via the conveyer to allow formation and growth of aligned carbon nanotubes thereon. Substrate materials which do not have substantial carbon solubility at temperatures below 900 C are preferred. Any suitable substrate for promoting the growth of carbon nanotubes may be employed, preferably an inert glass or metal with thermal stability at a temperature of from about 500 C to about 900 C. Suitable substrates include quartz, silicon, n-doped silicon, p-doped silicon, titanium nitride, and any combination thereof. In a preferred embodiment of the present invention, the residence time of the substrate within the reactor is from about 10 minutes to about 120 minutes.

The present apparatus allows continuous production of aligned carbon nanotubes with a tightly controlled range of external diameters, although it will be appreciated that control of the external diameter of carbon nanotubes grown in traditional batch procedures is also possible. Specifically, it has been discovered that the external diameter of aligned carbon nanotubes produced in accordance with the method and using the apparatus of the present invention may be controlled by passing the metal catalyst/liquid hydrocarbon feed solution dispersed in the inert carrier gas through an injector comprising a tubing of a particular inner diameter, followed by passing the feed solution through an inert, porous medium prior to delivery into the reactor. The inert, porous medium may be fabricated from any suitable inert powdered metal or ceramic, including any of the transition element metals or alloys thereof, as well as alumina, zirconia, silicon carbide, or silica ceramics. Specific examples include, but are not limited to, ceramic, alumina, steel, stainless steel, nickel, titanium, nickel-chromium alloys, or mixtures thereof. In a preferred embodiment, the inert, porous medium contains pores of from about 0.1 μm to about 1 μm in diameter. In accordance with the injector tubing and pore size of the porous medium selected, growth of aligned carbon nanotubes having external diameters of from about 4 nm to about 300 nm is possible.

The aligned carbon nanotubes may then be recovered from the substrate, for example by mechanical means such as scraping, brushing, or ultrasonic cleaning. Process gases may be vented, or in a preferred embodiment are recycled through the reactor to preserve the concentration of hydrogen in the carrier gas.

Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification illustrates several aspects of the present invention and, together with the description, serves to explain the principles of the invention. In the drawing.

Reference will now be made in detail to the presently preferred embodiments of the invention, examples of which are illustrated in the accompanying drawing.

DETAILED DESCRIPTION OF THE INVENTION

As summarized above, the present invention relates to novel apparatus for continuous production of aligned carbon nanotubes. The embodiments of the present invention may be practiced by various means which are illustrated in the examples below. These examples are intended to be illustrative only, as numerous modifications and variations will be apparent to those skilled in the art.

Figure 1:
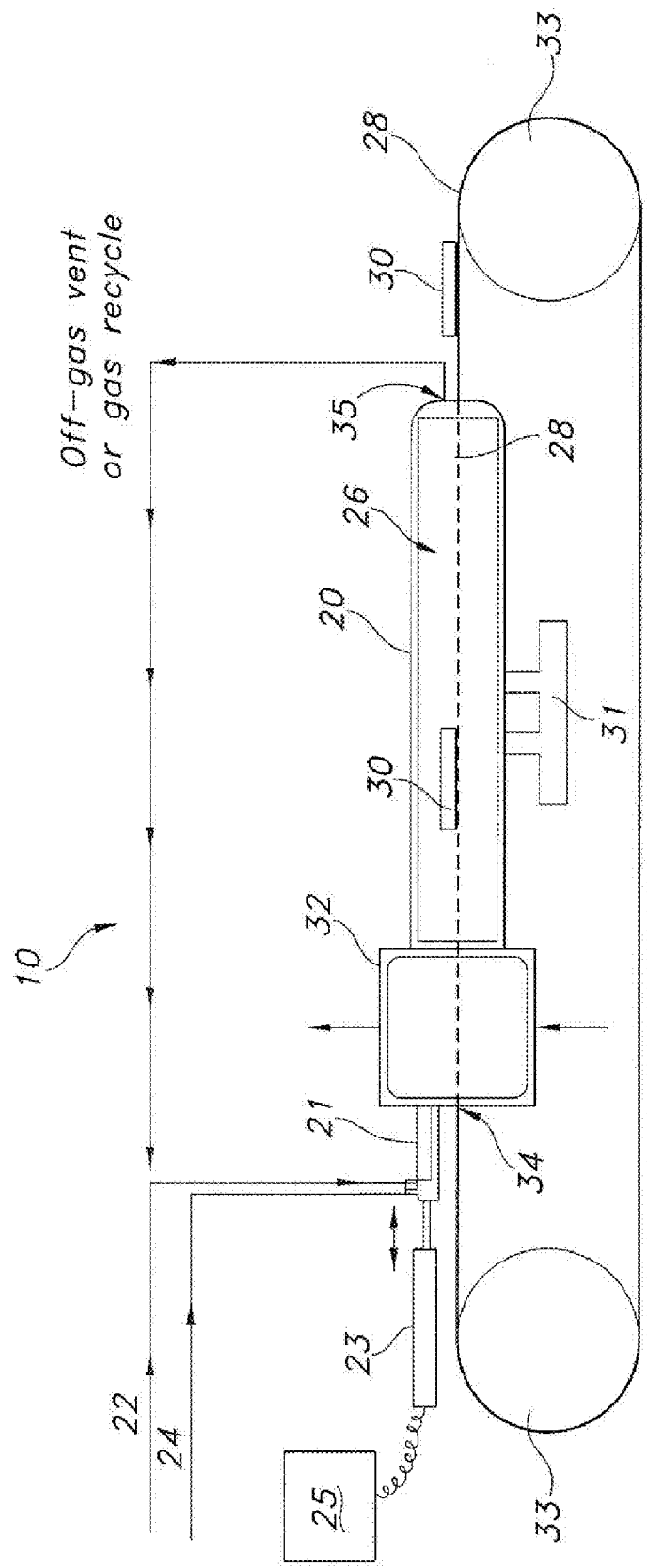
FIG. 1 is a schematic representation of the apparatus of the present invention for continuously producing aligned carbon nanotubes.

Referring now to FIG. 1, an apparatus 10 for continuous production of aligned carbon nanotubes is provided, comprising a reactor 20, an injector 21 for delivering a feed solution 22 dispersed in an inert carrier gas 24 into the hollow interior 26 of the reactor 20, and a conveyer 28, in the depicted example being an endless conveyor belt, for continuously passing a substrate 30 through the reactor 20 at a controlled speed. It should be appreciated that the direction in which the conveyer 28 passes the substrate 30 through the reactor 20 is not critical. A temperature controller 31 may be provided, for creating predetermined temperatures or temperature zones within the reactor 20. The apparatus 10 may further include an actuator, shown for purposes of demonstration as a rod-type electric cylinder 23 coupled to a controller 25, for axially moving the injector 21 within the reactor 20. Those of skill in the art will appreciate that the reactor 20 and conveyor 28 may be fabricated from any suitably inert material which substantially prevents carbon nanotube formation and growth thereon. In that way, nanotube formation and growth is substantially restricted to the substrate 30 as it passes through the reactor 20. Any suitably non-reactive metal or ceramic may be utilized, such as alumina, silicon carbide, Nichrome, and any combination.

It will be appreciated that the conveyor 28 is configured to pass the substrate 30 through the reactor 20 at a rate of travel which reduces formation of amorphous or pyrolytic carbon species. In one embodiment, the conveyer 28 passes the substrate 30 through the reactor 20 to provide a substrate residence time in the reactor 20 of from about 10 minutes to about 120 minutes, thereby optimizing growth conditions. The optimal substrate residence time, of course, will depend on variables such as the physical dimensions and temperature of the reactor 20, on the volatilization characteristics of the feed solution of choice, and the like.

An insert (not shown), generally having the shape of an inverted "D", may be included within the hollow interior 26 of the reactor 20 to provide support for the conveyor 28. However, it will be appreciated that any support means for the conveyer 28 may be adapted, such as a roller and track system (not shown) attached to the interior 26 of the reactor 20, or alternatively rollers 33 exterior of the reactor 20 as depicted in FIG. 1, around which conveyer 28 passes. The reactor 20 further includes a nitrogen purge box 32 located at the entry point 34 of the conveyor 28 for excluding ambient air/oxygen. It should be appreciated that any means for excluding ambient air, such as a gas curtain, is suitable for the method and apparatus 10 of this invention. Soft seals (not shown for convenience) of a known design may be included at the entry point 34 and the exit point 35 of the reactor 20 to further reduce entry of ambient air, contaminants, and the like into the interior 26 of the reactor 20.

Figure 2:
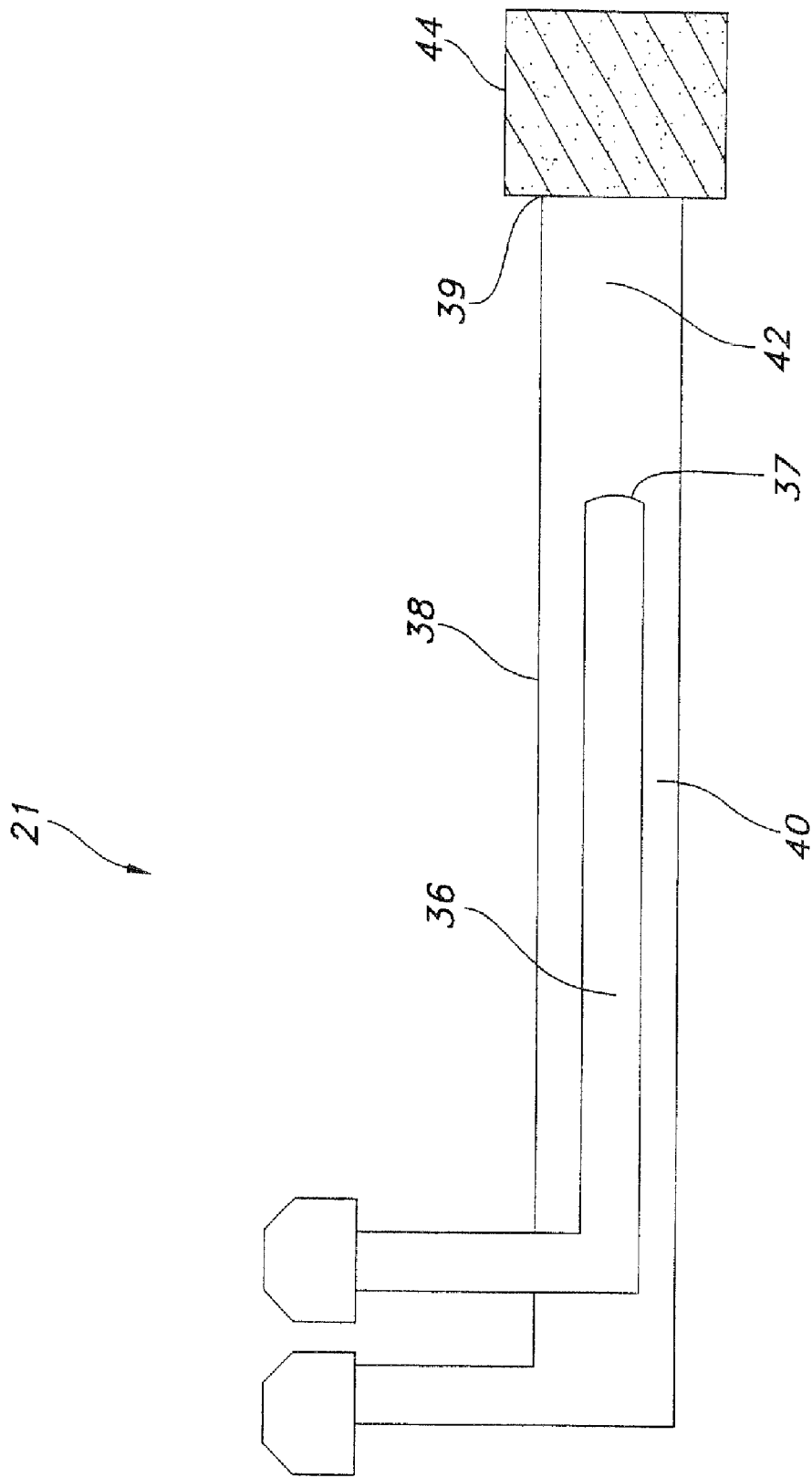
FIG. 2 is a schematic cross-sectional view of the injector of the present invention.

The injector 21 of the present invention, shown in isolation in FIG. 2, comprises a tube-within-a-tube design configured to improve the flow characteristics and feed consistency of the feed solution/carrier gas stream entering the reactor 20. In a presently preferred embodiment, the injector 21 comprises a first hollow tube 36 for delivering the feed solution as described supra and a second hollow tube 38 for delivering the inert carrier gas. The first hollow tube 36 is disposed in the interior of the second hollow tube 38, thereby defining an annulus 40 between the first and second hollow tubes 36, 38 through which the inert carrier gas may be delivered. The distal or delivery end 39 of the second tube 38 extends beyond the corresponding end 37 of the first tube 36, thereby defining a dispersion chamber 42 wherein the feed solution is dispersed into the inert carrier gas prior to entry into the reactor 20.

Preferably, the first hollow tube 36 has an outer cross-sectional area of from about 50 percent to about 90 percent of the internal cross-sectional area of the second hollow tube 38. To assure laminar flow characteristics of the feed solution/carrier gas entering the reactor 20, the carrier gas is delivered through the annulus 40 at a flow rate resulting in a Reynold's number of between about 1 and about 2000. In a particularly preferred embodiment, the carrier gas is delivered through the annulus 40 at a flow rate providing a Reynold's number of between about 50 and about 200.

The dimensions of the first and second tubes 36, 38, and their relative orientation, will primarily be determined by the size of reactor 20 employed. In general, the dimensions of the first and second tubes 36, 38, and their relative orientation are configured such that the dispersion chamber 42 formed thereby has a length of from about 1 to about 15 times its diameter. In a particularly preferred embodiment, the length of the dispersion 42 chamber is from about 8 to about 10 times its diameter. While the injector 21 as described is suitable for accomplishing the method of continuous production of aligned carbon nanotubes of the present invention as described, it will be appreciated that the injector 21 is also suitable for traditional batch processes for the growth of carbon nanotubes.

It is known to provide internal temperature zones having differing temperatures in standard reactors for use in production of carbon nanotubes by chemical vapor deposition. To provide such temperature zones, a single temperature controller 31 may be provided as shown in FIG. 1, or alternatively multiple temperature controllers 31 (embodiment not shown)

may be provided. Accordingly, the injector 21 of the present invention may be adapted to be selectively displaced within the reactor 20, as is depicted in FIG. 1. As will be appreciated by those skilled in the art and further described below, this feature obviates the need for multiple reactors providing different temperatures, such as for example a preheater (not shown) in sequence with a primary reactor 20 providing the desired reaction temperature for formation and growth of nanotubes. In one embodiment as shown in FIG. 1, the injector 21 may be selectively displaced along a longitudinal axis of the reactor 20, such as by the actuator 23. The axially movable injector 21 of the present design conveniently allows use of a single reactor 20, in which the feed solution/carrier gas may be delivered to any desired temperature zone within the reactor 20. Thus, placing the injector 21 in a lower temperature zone of the reactor 20 accomplishes the preheating and volatilization steps in an optimal manner without requiring a secondary furnace. In this manner, the required equipment for the process is minimized, resulting in lowered production costs and complexity.

EXAMPLE 1

An apparatus 10 for continuous production of aligned carbon nanotubes was constructed in accordance with the foregoing disclosure, and is schematically depicted in FIG. 1. A furnace of known design having the dimensions of 2 inches by 3 feet, with 3 heating zones including a 2 foot long reaction zone was utilized as the reactor 20. The final temperature in the reaction zone was brought to 800 C using a temperature controller 31. A feed solution of ferrocene (2.3 g) and xylene (20 g) was prepared. The feed solution was injected into the reactor 20 through an injector 21 as described herein, having a first (feed solution delivering) tube 36 with an outer diameter of 3.12 mm and a second (carrier gas delivering) tube 38 with an inner diameter of 3.75 mm, defining a dispersion chamber 42 having a length of 1.5 inches.

Argon/hydrogen carrier gas 24 flow was initiated and brought to 1200 sccm (1080 sccm Ar, 120 sccm $H_2$). Feed solution 22 was delivered into the reaction zone at a flow rate of 2.70 ml/h$^{-1}$. A conveyor 28 was activated, and passed a series of plain (unpatterned) quartz slide substrates 30 through the reactor 20 at a rate of travel providing a substrate 30 residence time within the reactor 20 of 34 minutes. Ambient air and oxygen were excluded from the interior of the reactor 20 using a nitrogen purge box 32 located at the entry point 34 of the reactor 20.

Figure 3A:
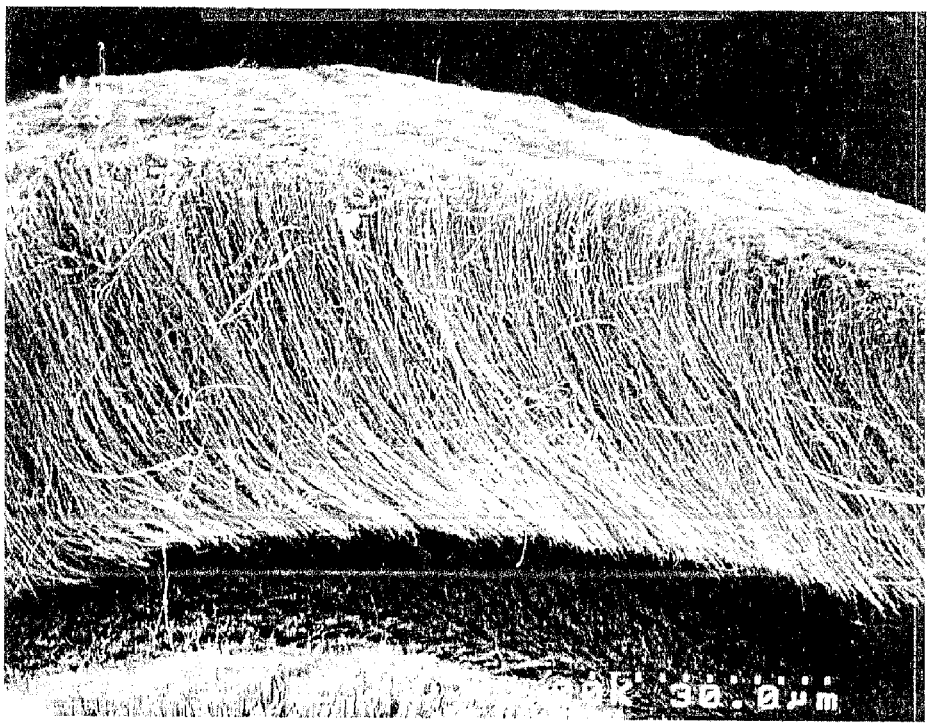
FIGS. 3a and 3b are scanning electron micrograph (SEM) images showing aligned carbon nanotubes produced according to the present invention.
Figure 3B:
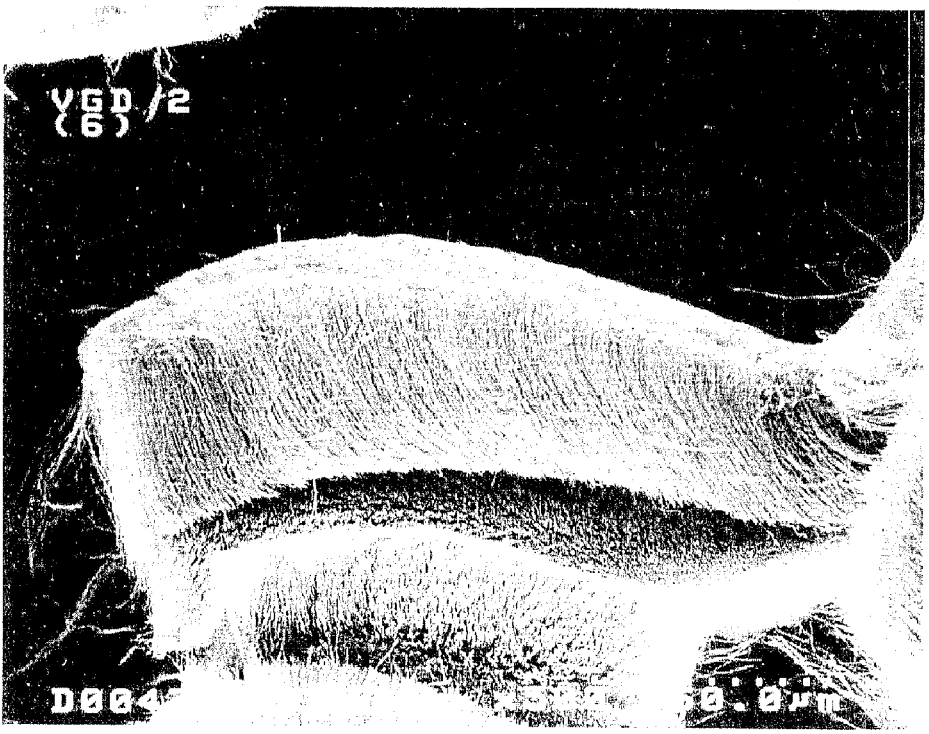

As seen in FIGS. 3a and 3b, the apparatus 10 of this invention produced aligned carbon nanotubes of high quality. It is important to note that the aligned carbon nanotubes were produced using the apparatus 10 of this invention without need for utilizing a patterned or etched substrate 30. Accordingly, unlike prior art methods requiring treatment of substrates to produce aligned carbon nanotubes, the method of this invention allows use of either patterned or unpatterned substrates as desired.

As described above, in another aspect of the present invention, the apparatus 10 may be used for continuous production of aligned carbon nanotubes having a tightly controlled range of external diameters. Surprisingly, it has been discovered that the external diameter of aligned carbon nanotubes produced in accordance with the method of the present invention may be controlled by regulating the inner diameter of the injector 21 tubing through which the feed solution 22 dispersed in the inert carrier gas 24 is passed to improve yield and selectivity, followed by passing the feed solution 22 through an inert, porous medium prior to delivery into the reactor. Referring to FIG. 2, an embodiment of the injector 21 of this invention is depicted, including a terminally (to the injector)-located sinter 44, comprising an inert, porous medium of selected pore size dimensions.

The inert, porous medium may be fabricated from any suitable inert powdered metal or ceramic, including the transition element metals and alloys thereof, as well as alumina, zirconia, silicon carbide, or silica ceramics. Specific examples include, but are not limited to, ceramic, alumina, steel, stainless steel, nickel, titanium, nickel-chromium alloys, and any mixture thereof. In a preferred embodiment, the inert, porous medium contains pores of from about 0.1 µm to about 1 µm in diameter.

The method of controlling the external diameter of carbon nanotubes of this invention therefore comprises the steps of: (1) dissolving a metal catalyst in a liquid hydrocarbon source to form a feed solution 22; (2) dispersing the feed solution in an inert carrier gas 24 in a dispersion chamber 42; (3) passing the feed solution 22/inert carrier gas 24 dispersion through an inert, porous medium of the disclosed poresizes, in the depicted embodiment being a sinter 44; (4) volatilizing the feed solution 22 in a reactor 20; (5) continuously passing a substrate 30 through the reactor 20 to allow formation and growth of aligned carbon nanotubes thereon; and (6) recovering aligned carbon nanotubes having a narrower overall diameter size distribution from the substrate 30.

Suitable dimensions and materials for fabrication of components necessary for restricting external diameter of aligned carbon nanotubes grown in the continuous process of the present invention are as disclosed supra. However, it should be appreciated that it is also possible to restrict external diameter of carbon nanotubes grown in traditional batch procedures. In accordance with the pore size of the porous medium selected, growth of aligned carbon nanotubes having homogenous external diameters of from about 4 nm to about 300 nm is made possible.

EXAMPLE 2

To test the injector 21 of the present invention, an apparatus 10 was prepared substantially as described in Example 1, with the exception that the apparatus 10 was adapted for a batch procedure for production of aligned carbon nanotubes rather than the continuous procedure described in Example 1. All other conditions were maintained as in Example 1. The feed solution 22 as disclosed in Example 1 was passed through stainless steel sinters 44 as described herein, placed terminally on the injector 21 adjacent the dispersion chamber 42. Sinters 44 having poresizes of 0.2 µm and 0.5 µm were compared to negative controls (no sinter). Feed solution 22 composition and run conditions were as described for Example 1, with the exception of use of a batch procedure.

Figure 4:
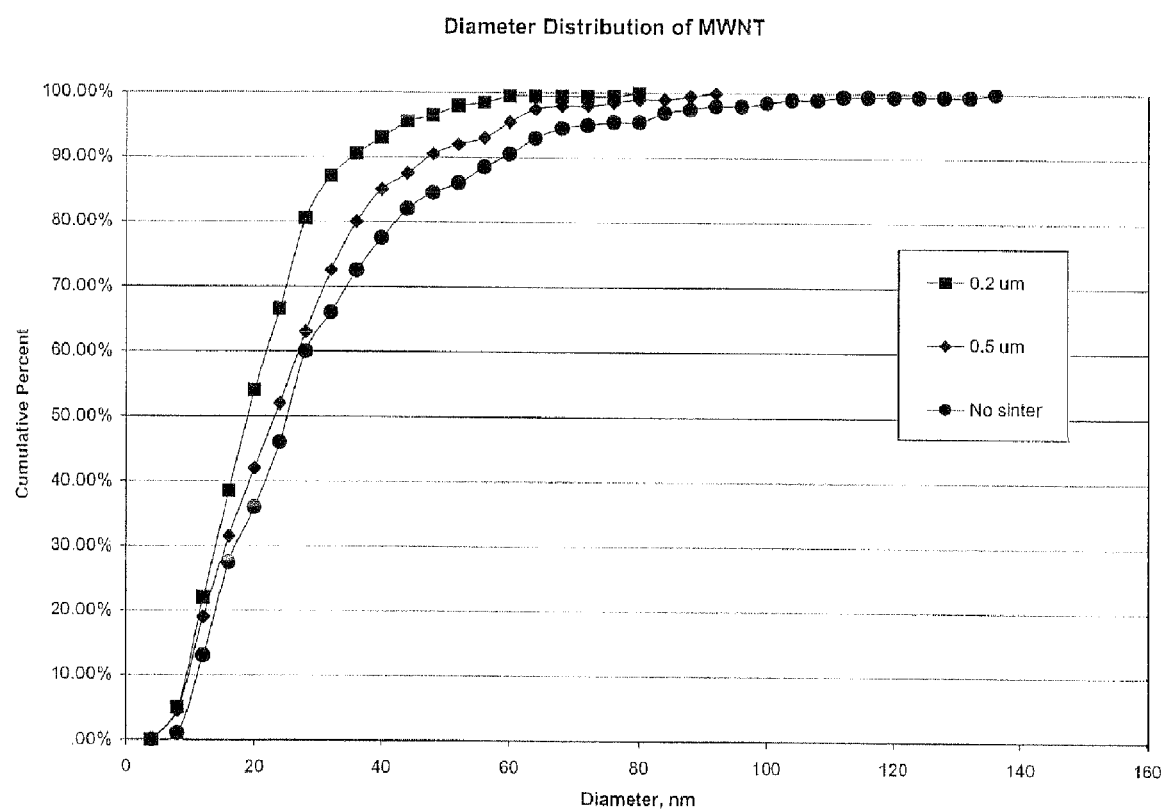
FIG. 4 shows the cumulative percent diameter distribution of aligned carbon nanotubes produced according to the present invention. The metal catalyst/liquid hydrogen feed solution was passed through stainless steel sinters having pore sizes of 0.5 μm and 0.2 μm for comparison to a control feed solution sample which was not passed through a sinter.

As seen in FIG. 4, passing the feed solution through sinters 44 having successively smaller pore sizes reduced both the maximum diameter and the average diameter of carbon nanotubes produced. Similarly, as sinter 44 pore size was reduced, the overall diameter size distribution of the carbon nanotubes produced became narrower. Accordingly, the present invention provides a relatively simple means for controlling the external diameter and the range of external diameters of carbon nanotubes produced, providing a more uniform, higher quality product.

As described herein and demonstrated in the foregoing examples, the present invention provides numerous advantages over currently employed batch processing methods. The labor required is significantly reduced, and synthesis of aligned carbon nanotubes is possible without need for use of specially patterned substrates. In contrast to batch processing techniques, batch to batch variation in quality is reduced. The ability to narrowly restrict the range of external diameters of the carbon nanotube population further improves the quality of the product. Accordingly, the apparatus of the present invention provides a viable, low cost route for large scale production of high quality, homogenous, aligned carbon nanotubes for use in a variety of applications.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for continuous production of aligned carbon nanotubes, comprising:
    a reactor defining a hollow interior;
    a conveyor for continuously passing a substrate through the hollow interior of the reactor at a predetermined rate of travel; and
    an injector for delivering a hydrocarbon feed solution dispersed in an inert carrier gas into the hollow interior of the reactor;
    whereby aligned carbon nanotubes are formed on the substrate.

2. The apparatus of claim 1, wherein the reactor and conveyer are fabricated from an inert material which substantially inhibits nanotube growth thereon.

3. The apparatus of claim 2, wherein the inert material is any non-reactive metal or ceramic which substantially inhibits nanotube growth thereon.

4. The apparatus of claim 3, wherein the inert material is selected from the group consisting of alumina, silicon carbide, Nichrome, and any mixture thereof.

5. The apparatus of claim 1, wherein the conveyor passes the substrate through the hollow interior of the reactor at a rate of travel providing a substrate residence time within the reactor of from about 10 minutes to about 120 minutes.

6. The apparatus of claim 1, wherein the injector comprises:
    a first hollow tube for delivering a feed solution; and
    a second hollow tube for delivering an inert carrier gas;
    wherein the first hollow tube is disposed in an interior of the second hollow tube, thereby defining an annulus between the first hollow tube and the second hollow tube; and
    wherein an end of the second tube extends beyond a corresponding end of the first tube to define a dispersion chamber having a length and a diameter for dispersing the feed solution into the inert carrier gas.

7. The apparatus of claim 6, wherein the first hollow tube has an outer cross-sectional area of from about 50 percent to about 90 percent of an internal cross-sectional area of the second hollow tube.

8. The apparatus of claim 7, wherein the injector is adapted whereby the inert carrier gas is delivered through the annulus at a Reynold's number of between about 1 and about 2000.

9. The apparatus of claim 8, wherein the injector is adapted whereby the inert carrier gas is delivered through the annulus at a Reynold's number of between about 50 and about 200.

10. The apparatus of claim 6, wherein the dispersion chamber has a length of from about 1 to about 15 times the diameter of the dispersion chamber.

11. The apparatus of claim 10, wherein the dispersion chamber has a length of from about 8 to about 10 times the diameter of the dispersion chamber.

12. The apparatus of claim 1, further comprising an inert, porous medium through which the feed solution dispersed in the inert carrier gas is passed prior to entry into the reactor.

13. The apparatus of claim 12, wherein the inert, porous medium is fabricated from the group consisting of transition metal elements, transition metal element alloys, zirconia, silicon carbide, silica ceramics, and combinations thereof.

14. The apparatus of claim 12, wherein the inert, porous medium is a sinter fabricated from the group of materials consisting of ceramic, alumina, steel, stainless steel, titanium, and any mixture thereof.

15. The apparatus of claim 12, wherein the inert, porous medium contains a plurality of pores having a diameter of from about 0.1 µm to about 1 µm.

16. The apparatus of claim 1, further including a temperature controller for selectively controlling a temperature of the hollow interior of the reactor.

17. The apparatus of claim 1, further including an actuator for selectively displacing an end of the injector within the hollow interior of the reactor.

18. The apparatus of claim 1, further including means for excluding ambient air from the hollow interior.

19. The apparatus of claim 18, wherein the means for excluding ambient air from the interior of the reactor comprises a purge box adjacent an opening of the reactor.

20. The apparatus of claim 18, wherein the means for excluding ambient air from the interior of the reactor comprises a gas curtain adjacent an opening of the reactor.

* * * * *